(12) United States Patent
Kneidel et al.

(10) Patent No.: US 8,727,086 B2
(45) Date of Patent: May 20, 2014

(54) THREE-STAGE HYSTERESIS FOR SERIES DAMPER

(75) Inventors: Craig Kneidel, Massillon, OH (US); Markus Steinberger, Macedonia, OH (US)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 266 days.

(21) Appl. No.: 13/314,460

(22) Filed: Dec. 8, 2011

(65) Prior Publication Data

US 2012/0160627 A1 Jun. 28, 2012

Related U.S. Application Data

(60) Provisional application No. 61/426,060, filed on Dec. 22, 2010.

(51) Int. Cl.
*F16H 45/02* (2006.01)
(52) U.S. Cl.
USPC .................................... 192/3.29; 192/213.22
(58) Field of Classification Search
USPC .................................................. 192/213.22
See application file for complete search history.

(56) References Cited

U.S. PATENT DOCUMENTS

| | | | | |
|---|---|---|---|---|
| 4,559,024 | A | * | 12/1985 | Tamura et al. ............... 464/68.4 |
| 6,244,401 | B1 | | 6/2001 | Maienschein et al. |
| 2006/0266606 | A1 | * | 11/2006 | Back et al. ..................... 192/3.3 |
| 2009/0107792 | A1 | | 4/2009 | Kneidel et al. |

FOREIGN PATENT DOCUMENTS

DE 10010953 9/2000

* cited by examiner

*Primary Examiner* — Rodney Bonck
(74) *Attorney, Agent, or Firm* — Simpson & Simpson, PLLC

(57) ABSTRACT

A torque converter damper, including: an output hub; a first side plate arranged for rotational connection to a lock-up clutch and a turbine of the torque converter. Includes first and second intermediate flange plates; a flange connected to the output hub; springs engaged with the first side plate and the intermediate flange plates; springs engaged with the intermediate flange plates and with the flange; and a resilient element creating frictional contact between first and second components of the torque converter damper. Relative rotation of the first and second components at the frictional contact attenuates vibration at the output hub. The first and second components are rotatable with respect to each other. Rotation of the first component is fixed to rotation of the hub. Rotation of the second component is arranged to be fixed to rotation of the turbine. The hub is arranged to be rotatable with respect to the turbine.

15 Claims, 5 Drawing Sheets

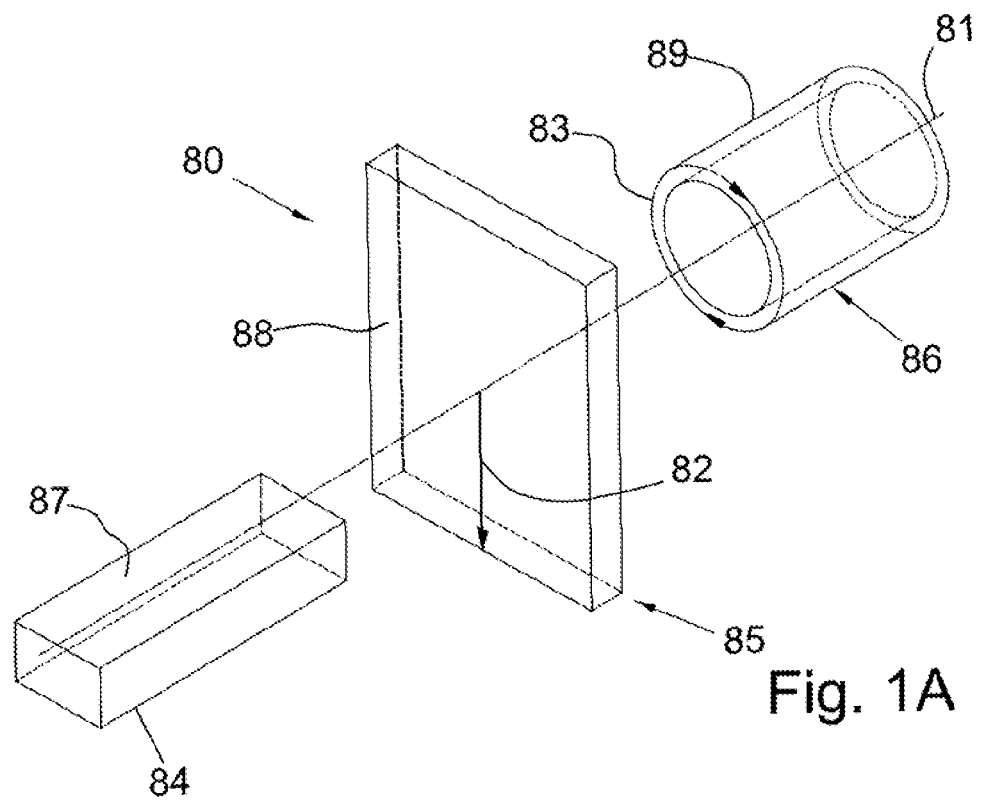
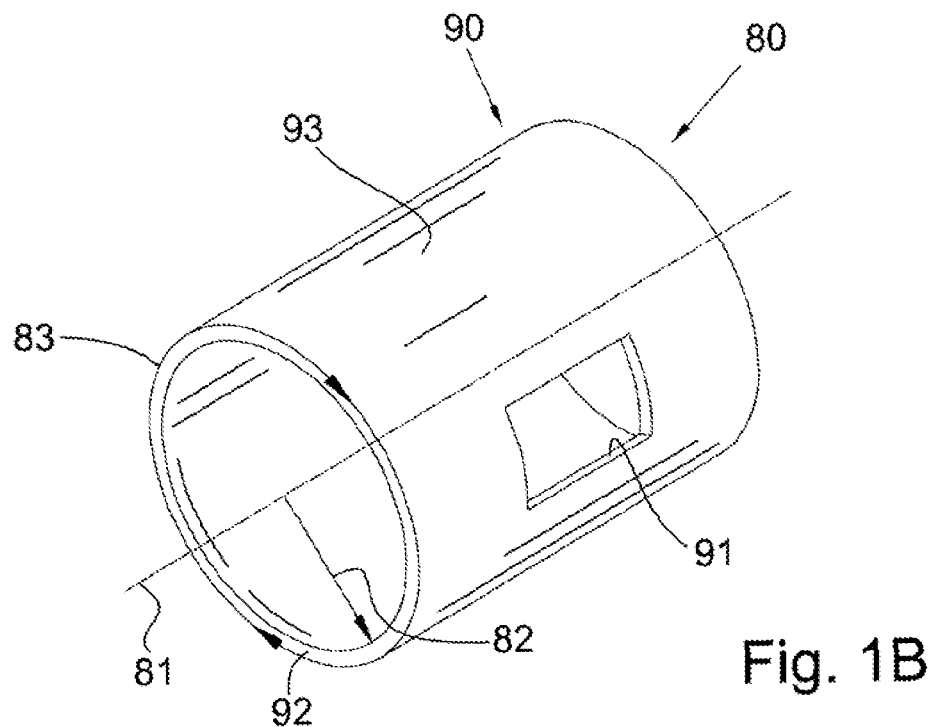

US 8,727,086 B2

THREE-STAGE HYSTERESIS FOR SERIES DAMPER

CROSS-REFERENCE TO RELATED APPLICATIONS

This application claims the benefit under 35 U.S.C. §119(e) of U.S. Provisional Application No. 61/426,060 filed Dec. 22, 2010, which application is incorporated herein by reference.

TECHNICAL FIELD

The present disclosure relates to a torque converter with improved hysteresis among the components of the torque converter, in particular, hysteresis between a turbine and an output hub of the torque converter.

BACKGROUND

FIG. 5 is a partial cross-sectional view of prior art torque converter 200 with a resilient element to produce hysteresis. It is known to use a resilient element, for example, resilient element 202, to cause portions of a damper assembly in a torque converter to become frictionally engaged to create hysteresis between components of the damper. For example, resilient element 202 reacts against side plate 204, fixed with respect to side plate 206, to apply axial force to intermediate flange plate 208, which is fixed to intermediate flange plate 210. As a result, areas of frictional contact 212 and 214 are created between the resilient element and intermediate flange plate 208 and between plate 206 and intermediate flange plate 210, respectively. Hysteresis is created between the turbine and the intermediate flange plates at the areas of frictional contact. The hysteresis is limited to a same stage of the wind up for the damper assembly.

SUMMARY

According to aspects illustrated herein, there is provided a torque converter damper, including: an output hub for connection to a transmission input shaft; at least one first side plate arranged for connection to a lock-up clutch for a torque converter so as to rotate in unison with at least a portion of the lock-up clutch and arranged for connection to a turbine of the torque so as to rotate in unison with the turbine. The damper includes first and second intermediate flange plates; a flange connected to the output hub; a first plurality of springs engaged with the at least one first side plate and with the first and second intermediate flange plates; a second plurality of springs engaged with the first and second intermediate flange plates and with the flange; and a first resilient element. An axial force applied by the first resilient element creates a first area of frictional contact between first and second components of the torque converter damper. Relative rotation of the first and second components at the first area of frictional contact attenuates vibration at the output hub. The first and second components are rotatable with respect to each other. Rotation of the first component is fixed to rotation of the output hub. Rotation of the second component is arranged to be fixed to rotation of the turbine. The output hub is arranged to be rotatable with respect to the turbine.

According to aspects illustrated herein, there is provided a torque converter, including: an output hub for connection to a transmission input shaft; a cover arranged to receive torque from an engine; a lock-up clutch engageable with the cover; a turbine; and a damper assembly including: first and second side plates connected to the lock-up clutch so as to rotate in unison with at least a portion of the lock-up clutch, the second side plate connected to the turbine so that rotation of the second side plate is fixed to rotation of the turbine; first and second intermediate flange plates; a flange connected to the output hub; a first plurality of springs engaged with the first and second side plates and with the first and second intermediate flange plates; and a second plurality of springs engaged with the first and second intermediate flange plates and with the flange. The torque converter includes a first resilient element engaged with the first intermediate flange plate and the flange and a second resilient element arranged to rotate in unison with the turbine or to rotate in unison with the output hub. The output hub is rotatable with respect to the turbine. A first axial force applied by the first resilient element to the flange creates a first area of frictional contact between the output hub and the second side plate. Relative rotation of the output hub and the second side plate at the first area of frictional contact damps oscillation of the output hub.

According to aspects illustrated herein, there is provided a torque converter, including: an output hub for connection to a transmission input shaft; a cover arranged to receive torque from an engine; a lock-up clutch engageable with the cover; a turbine; and a damper assembly including: first and second side plates connected to the lock-up clutch so as to rotate in unison with at least a portion of the lock-up clutch, the second side plate connected to the turbine so that rotation of the second side plate is fixed to rotation of the turbine; first and second intermediate flange plates; a flange connected to the output hub; a first plurality of springs engaged with the first and second side plates and with the first and second intermediate flange plates; and a second plurality of springs engaged with the first and second intermediate flange plates and with the flange. The torque converter includes a first resilient element engaged with the first intermediate flange plate and the flange; and a second resilient element arranged to rotate in unison with the turbine or to rotate in unison with the output hub. The output hub is rotatable with respect to the turbine. A first axial force applied by the first resilient element to the flange creates a first area of frictional contact between the output hub and the second side plate. Relative rotation of the output hub and the second side plate at the first area of frictional contact damps oscillation of the output hub.

These and other objects and advantages of the present disclosure will be readily appreciable from the following description of the invention and from the accompanying drawings and claims.

BRIEF DESCRIPTION OF THE DRAWINGS

Various embodiments are disclosed, by way of example only, with reference to the accompanying schematic drawings in which corresponding reference symbols indicate corresponding parts, in which:

FIG. 1A is a perspective view of a cylindrical coordinate system demonstrating spatial terminology used in the present application;

FIG. 1B is a perspective view of an object in the cylindrical coordinate system of FIG. 1A demonstrating spatial terminology used in the present application; and, FIG. 2 is a partial cross-sectional view of a torque converter with increased hysteresis between a turbine and an output hub;

DETAILED DESCRIPTION

Figure 2:
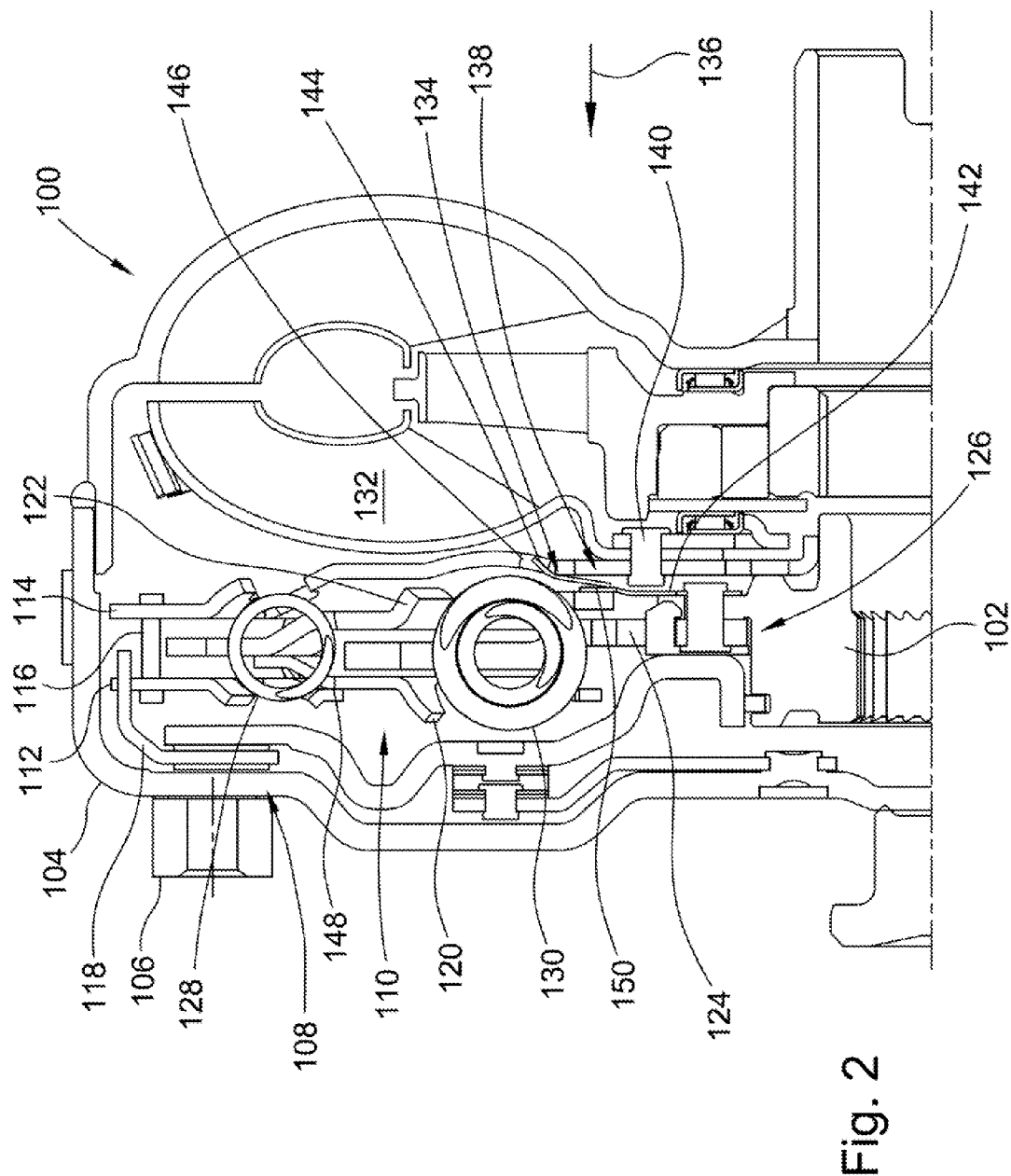

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

FIG. 1A is a perspective view of cylindrical coordinate system 80 demonstrating spatial terminology used in the present application. The present invention is at least partially described within the context of a cylindrical coordinate system. System 80 has a longitudinal axis 81, used as the reference for the directional and spatial terms that follow. The adjectives "axial," "radial," and "circumferential" are with respect to an orientation parallel to axis 81, radius 82 (which is orthogonal to axis 81), and circumference 83, respectively. The adjectives "axial," "radial" and "circumferential" also are regarding orientation parallel to respective planes. To clarify the disposition of the various planes, objects 84, 85, and 86 are used. Surface 87 of object 84 forms an axial plane. That is, axis 81 forms a line along the surface. Surface 88 of object 85 forms a radial plane. That is, radius 82 forms a line along the surface. Surface 89 of object 86 forms a circumferential plane. That is, circumference 83 forms a line along the surface. As a further example, axial movement or disposition is parallel to axis 81, radial movement or disposition is parallel to radius 82, and circumferential movement or disposition is parallel to circumference 83. Rotation is with respect to axis 81.

The adverbs "axially," "radially," and "circumferentially" are with respect to an orientation parallel to axis 81, radius 82, or circumference 83, respectively. The adverbs "axially," "radially," and "circumferentially" also are regarding orientation parallel to respective planes.

FIG. 1B is a perspective view of object 90 in cylindrical coordinate system 80 of FIG. 1A demonstrating spatial terminology used in the present application. Cylindrical object 90 is representative of a cylindrical object in a cylindrical coordinate system and is not intended to limit the present invention in any manner. Object 90 includes axial surface 91, radial surface 92, and circumferential surface 93. Surface 91 is part of an axial plane, surface 92 is part of a radial plane, and surface 93 is a circumferential surface.

FIG. 2 is a partial cross-sectional view of torque converter 100 with increased hysteresis between a turbine and an output hub. Torque converter 100 includes output hub 102 for connection to a transmission input shaft (not shown), cover 104 arranged to receive torque from an engine (not shown), for example, via lugs 106, lock-up clutch 108 engageable with the cover, and damper assembly 110. The damper assembly includes side plates 112 and 114 connected to the lock-up clutch so as to rotate in unison with at least a portion of the lock-up clutch. In an example embodiment, plates 112 and 114 are fixed to each other, for example, by element 116, and plate 112 is connected to, or engaged with, drive plate 118 of the lock-up clutch. That is, plates 112 and 114 rotate in unison and plates 112 and 118 rotate in unison. The damper assembly also includes intermediate flange plates 120 and 122 and flange 124 connected to the output hub, for example by rivet 126. Plurality of springs 128 is engaged with the side plates and with the intermediate flange plates. Plurality of springs 130 is engaged with the intermediate flange plates and with the flange.

The torque converter includes turbine 132 and resilient element 134 rotatable in unison with the turbine. Resilient element 134 can be any resilient element known in the art, for example, a diaphragm spring, or Belleville washer. Axial force 136 applied by resilient element 134 to the damper assembly creates area of frictional contact 138 between two components of the torque converter. The two components are rotatable with respect to each other. Relative rotation of the two components at area of frictional contact 138 restrains, dampens, or retards rotation of the output hub. For example, rotational energy of the output hub is dissipated in frictional energy at area 138. Stated otherwise, inertia of the output hub is transmittable through a first of the components, inertia of the turbine is transmittable through a second of the components, and the inertia of the turbine counteracts, at area 138, the inertia of the output hub. Thus, hysteresis involving the output hub and the turbine is created at area 138. For example, undesirable vibration from the engine and operation of the clutch can be transmitted to the output hub and manifested in the rotation of the output hub. This undesirable vibration is cancelled by or at least attenuated by the inertia of the turbine via the frictional contact of the two components. That is, the vibration is dissipated into heat energy via the frictional engagement of the components noted above.

In an example embodiment, the side plates are connected with the turbine so as to rotate in unison with the turbine, for example, side plate 114 is connected to the turbine by rivet 140. The output hub and the turbine are able to rotate with respect to each other, for example, due to springs 128 and 130 between the flange/output hub and plate 114/turbine 132. The respective inertias of the output hub and the turbine are in communication at area of frictional contact 138.

In an example embodiment, the torque converter includes plate 142 fixed to the output hub. Side plate 114 is fixed to the turbine, and resilient element 134 is engaged with the side plate 114, for example, via tabs 144 in slots 146 of plate 114, so as to rotate in unison with the turbine. In this configuration, the first of the components includes plate 142 and the second of the components includes resilient element 134. The inertia for the output hub is transmitted via plate 142 and the inertia of the turbine is transmitted via side plate 114 and resilient element 134.

Thus, relative rotation of plate 142 and resilient element 134 at area of frictional contact 138 damps oscillation of the output hub. For example, vibratory energy of the output hub is dissipated as frictional energy at area 138. Stated otherwise, inertia of the output hub is transmittable through plate 142, inertia of the turbine is transmittable through resilient element 134, and the inertia of the turbine counteracts, through friction at area 138, the inertia and undesirable vibration of the output hub. It should be noted, however, that resilient element 134 may be rotationally connected with intermediate flange plate 122 or plate 142, such that area of frictional contact 156 includes portions of element 134 and side plate 114.

In an example embodiment, axial force 136 creates area of frictional contact 148 between side plate 112 and intermediate flange plate 120. Inertia of the turbine is transmittable through side plate 114 to side plate 112, and the inertia of the turbine counteracts, at area 148, inertia and undesirable vibration of the intermediate flange plates. Thus, desirable hysteresis is created between the turbine and the intermediate flange plates at area of frictional contact 148.

In an example embodiment, axial force 136 creates area of frictional contact 150 between plate 142 and intermediate flange plate 122. Inertia of the output hub is transmittable to plate 142, and the inertia of the intermediate flange plates counteracts, at area 150, inertia and undesirable vibration of the output hub. Thus, desirable hysteresis is created between the output hub and the intermediate flange plates at area of frictional contact 150.

Figure 3:
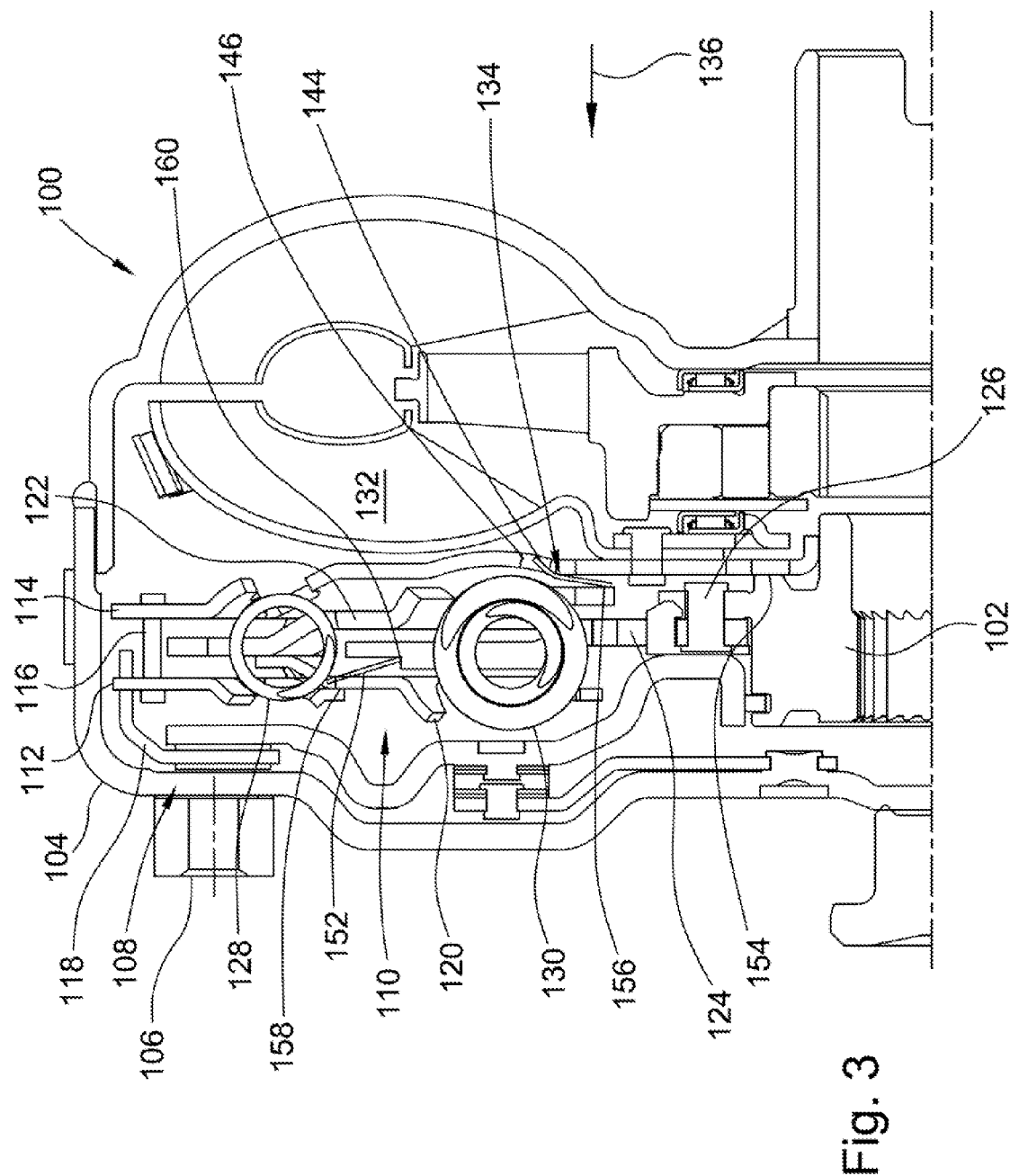
FIG. 3 is a partial cross-sectional view of a torque converter with increased hysteresis between a turbine and an output hub.

FIG. 3 is a partial cross-sectional view of torque converter 100 with increased hysteresis between a turbine and an output hub. In an example embodiment, the torque converter includes resilient element 152 rotationally connected with intermediate flange 120 and engaged with flange 124. Side plate 114 is fixed to the turbine, and resilient element 152 urges the flange against the output hub so that the output hub engages side plate 114 at area of frictional contact 154. In this configuration, the first of the components noted supra includes the output hub and the second of the components noted supra includes side plate 114. The inertia of the turbine is transmittable via side plate 114. Thus, hysteresis involving the output hub and the turbine is created at area 154. For example, undesirable vibration from the engine and operation of the clutch can be transmitted to the output hub and manifested in the rotation of the output hub. This undesirable vibration is cancelled by or at least attenuated by the inertia of the turbine. That is, the vibration exhausts itself via the frictional engagement of the components carrying the vibration with the turbine or with elements fixed to the turbine.

In an example embodiment, axial force 136 creates area of frictional contact 156 between resilient element 134 and intermediate flange plate 122. Inertia of the turbine is transmittable through resilient element 134, and inertia of the turbine counteracts, at area 156, inertia and undesirable vibration of the intermediate flange plates. Thus, desirable hysteresis is created between the turbine and the intermediate flange plates at area of frictional contact 156. It should be noted, however, that resilient element 134 may be rotationally connected with intermediate flange plate 122, such that area of frictional contact 156 includes portions of element 134 and side plate 114.

In an example embodiment, axial force 136 creates area of frictional contact 158 between side plate 112 and intermediate flange plate 120. Inertia of the turbine is transmittable through side plate 114 to side plate 112, and the inertia of the turbine counteracts, at area 158, inertia and undesirable vibration of the intermediate flange plates. Thus, desirable hysteresis is created between the turbine and the intermediate flange plates at area of frictional contact 158.

In an example embodiment, resilient element 152 is rotationally connected to intermediate flange 120 and engaged with flange 124 at area of frictional contact 160. Inertia of the output hub is transmittable through flange 124, and the inertia of the intermediate flange plates counteracts, at area 160, inertia and undesirable vibration of the output hub. Thus, desirable hysteresis is created between the output hub and the intermediate flange plates at area of frictional contact 160. It should be noted, however, that resilient element 152 may be rotationally connected with flange plate 124, such that area of frictional contact 160 includes portions of element 152 and intermediate flange 120.

Figure 4A:
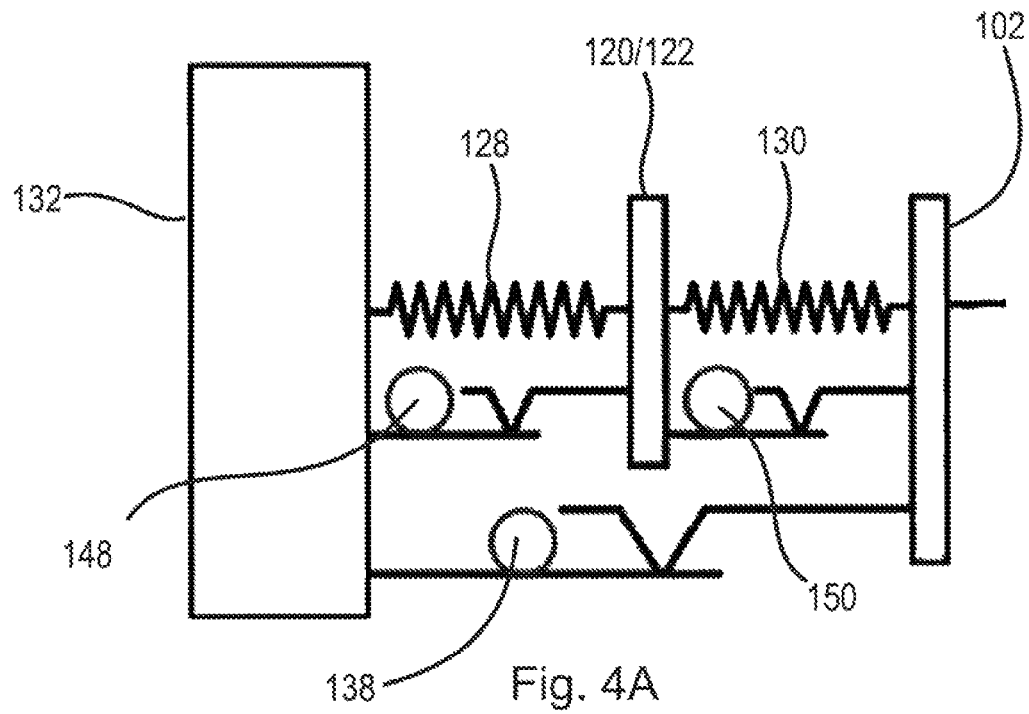
FIGS. 4A and 4B are schematic diagrams showing the friction paths in FIGS. 2 and 3, respectively; and, FIG. 5 is a partial cross-sectional view of a prior art torque converter with a resilient element to produce hysteresis.
Figure 4B:
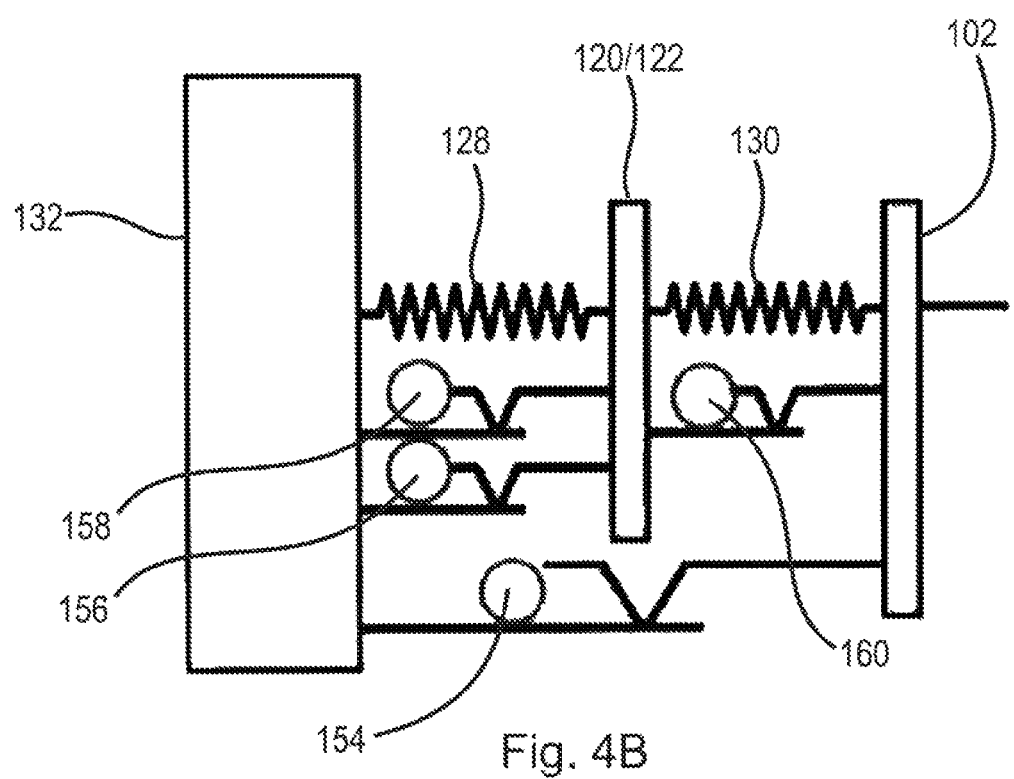
Figure 5:
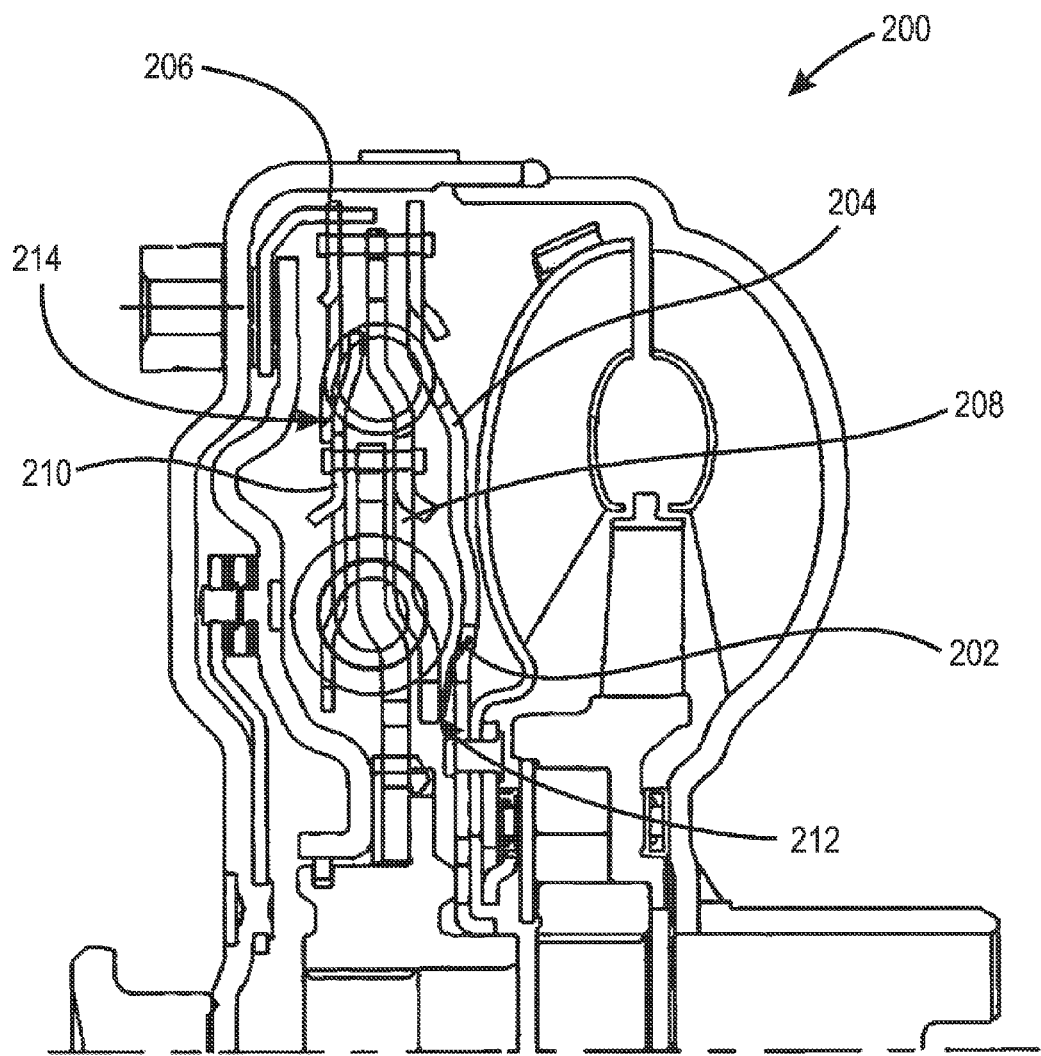

FIGS. 4A and 4B are schematic diagrams showing the friction paths in FIGS. 2 and 3, respectively;

As noted supra, in FIG. 5, diaphragm spring 202 creates a maximum of two surfaces with relative friction, specifically, areas of frictional contact 212 and 214. These two surfaces are always only active during the same stage of the damper windup, act in parallel to each other, and create hysteresis only between the turbine and the intermediate flanges. Specifically, there is no hysteresis created between the intermediate flanges and the output hub or between the turbine and the output hub.

Advantageously, torque converter 100 provides hysteresis between the turbine and the intermediate flanges, between the intermediate flanges and the output hub, and between the turbine and the output hub. The additional hysteresis eliminates or greatly attenuates clutch shudder associated with operation of the torque converter. Further, the configuration in FIG. 2 is modular. Assuming a standard configuration of damper assembly 110 with respect to turbine 132, resilient element 134 and plate 142 can be inserted without making any modifications to the standard configuration. For example, the relative sizes and positions of the damper assembly components and the turbine do not need to be altered to install resilient element 134 and plate 142, reducing cost and complexity.

Resilient element 134, is for example, a diaphragm spring, or Belleville washer. Element 134 is compressed between side plate 112 and plates 122 and 142, creating an axial force. Since plate 112 is fixed to the turbine, the axial force is substantially transmitted to plates 122 and 142. Advantageously, the axial force and subsequent displacement of components in the damper assembly creates the additional frictional contact between the intermediate flanges and the output hub, and between the turbine and the output hub. Referring to FIG. 2, the first frictional contact is at area 150 and the second frictional contact is at area 138. Advantageously, friction, or hysteresis, at area 138 is active across the entire series damper windup.

In FIG. 2, torque converter 100 adds additional hysteresis surfaces (areas 138 and 150 for example) in desired locations without the addition of another diaphragm spring or any special re-arrangement of the surrounding components. This configuration leads to a modular arrangement in which hysteresis can be easily re-directed to be active across different parts of the damper windup by simply adding or removing plate 142. For example, in FIG. 2, with plate 142 installed, areas 138, 148, and 150 provide hysteresis. For example, in FIG. 4, without plate 142, but with element 152, areas 154, 156, 158, and 160 provide hysteresis.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What we claim is:

1. A torque converter damper, comprising:
    an output hub for connection to a transmission input shaft;
    at least one first side plate arranged for:
        connection to a lock-up clutch for a torque converter so as to rotate in unison with at least a portion of the lock-up clutch; and,
        connection to a turbine of the torque converter so as to rotate in unison with the turbine;

first and second intermediate flange plates;
a flange connected to the output hub;
a first plurality of springs engaged with the at least one first side plate and with the first and second intermediate flange plates;
a second plurality of springs engaged with the first and second intermediate flange plates and with the flange; and,
a first resilient element, wherein:
an axial force applied by the first resilient element creates a first area of frictional contact between first and second components of the torque converter damper;
relative rotation of the first and second components at the first area of frictional contact attenuates vibration at the output hub;
the first and second components are rotatable with respect to each other;
rotation of the first component is fixed to rotation of the output hub;
rotation of the second component is arranged to be fixed to rotation of the turbine; and,
the output hub is arranged to be rotatable with respect to the turbine.

2. The torque converter damper of claim 1, wherein relative rotation of the first and second components at the first area of frictional contact damps oscillation of the output hub.

3. The torque converter damper of claim 1, further comprising a plate fixed to the output hub, wherein:
the at least one first side plate is arranged to be fixed to the turbine;
the first resilient element is engaged with the at least one first side plate and with the plate; and,
the first component includes the plate and the second component includes the first resilient element; or,
the first component includes the first resilient element and the second component includes the at least one first side plate.

4. The torque converter damper of claim 3, wherein the first component includes the plate and the second component includes the first intermediate flange plate.

5. The torque converter damper of claim 1, wherein the axial force applied by the first resilient element creates a second area of frictional contact between the at least one first side plate and the first intermediate flange plate.

6. The torque converter damper of claim 1, wherein the at least one first side plate includes:
a first side plate arranged for connection to the lock-up clutch so as to rotate in unison with at least a portion of the lock-up clutch; and,
a second side plate rotationally connected to the first side plate and arranged to be rotationally connected to the turbine, the damper further comprising a second resilient element engaged with the flange and the first intermediate flange, wherein the second resilient element urges the flange against the output hub so that the output hub engages the second side plate.

7. The torque converter damper of claim 6, wherein the axial force applied by the first resilient element creates:
a second area of frictional contact between the first resilient element and the second intermediate flange; or,
a second area of frictional contact between the first resilient element and the second side plate.

8. The torque converter damper of claim 6, wherein an axial force applied by the second resilient element creates:
a second area of frictional contact between the second resilient element and the first intermediate flange plate; or,
a second area of frictional contact between the second resilient element and the flange.

9. A torque converter, comprising:
an output hub for connection to a transmission input shaft;
a cover arranged to receive torque from an engine;
a lock-up clutch engageable with the cover;
a turbine;
a damper assembly including:
first and second side plates connected to the lock-up clutch so as to rotate in unison with at least a portion of the lock-up clutch, the second side plate connected to the turbine so that rotation of the second side plate is fixed to rotation of the turbine;
first and second intermediate flange plates;
a flange connected to the output hub;
a first plurality of springs engaged with the first and second side plates and with the first and second intermediate flange plates; and,
a second plurality of springs engaged with the first and second intermediate flange plates and with the flange;
a plate fixed to the output hub; and,
a resilient element arranged to rotate in unison with the turbine or to rotate in unison with the output hub, wherein:
the output hub is rotatable with respect to the turbine;
an axial force applied by the resilient element creates an area of frictional contact between the plate and the resilient element or between the resilient element and the second side plate; and,
relative rotation of the plate and the resilient element or of the resilient element and the second side plate at the area of frictional contact damps oscillation of the output hub.

10. The torque converter of claim 9, wherein the resilient element is engaged with the second side plate, or with the plate, or with the first intermediate flange plate.

11. The torque converter of claim 9, wherein the axial force applied by the resilient element creates a second area of frictional contact between the first side plate and the first intermediate flange plate.

12. The torque converter of claim 9, wherein the axial force applied by the first resilient element to the damper assembly creates a second area of frictional contact between the plate and the first intermediate flange plate.

13. A torque converter, comprising:
an output hub for connection to a transmission input shaft;
a cover arranged to receive torque from an engine;
a lock-up clutch engageable with the cover;
a turbine;
a damper assembly including:
first and second side plates connected to the lock-up clutch so as to rotate in unison with at least a portion of the lock-up clutch, the second side plate connected to the turbine so that rotation of the second side plate is fixed to rotation of the turbine;
first and second intermediate flange plates;
a flange connected to the output hub;
a first plurality of springs engaged with the first and second side plates and with the first and second intermediate flange plates; and,
a second plurality of springs engaged with the first and second intermediate flange plates and with the flange;
a first resilient element engaged with the first intermediate flange plate and the flange; and,
a second resilient element arranged to rotate in unison with the turbine or to rotate in unison with the output hub, wherein:

the output hub is rotatable with respect to the turbine;

a first axial force applied by the first resilient element to the flange creates a first area of frictional contact between the output hub and the second side plate; and, relative rotation of the output hub and the second side plate at the first area of frictional contact damps oscillation of the output hub.

14. The torque converter of claim 13, wherein the first axial force creates a second area of frictional contact between the first resilient element and the flange or between the first resilient element and the first intermediate flange plate.

15. The torque converter of claim 13, wherein a second axial force applied by the second resilient element to the second intermediate flange plate creates:

a second area of frictional contact between the second resilient element and the second intermediate flange plate or between the second resilient element and the second side plate; and, a third area of frictional contact between the first side plate and the first intermediate flange plate.

* * * * *